W. L. HOPPER.
Device for Catching Animals.

No. 68,197.

Patented Aug. 27, 1867.

Witnesses:

Inventor:
W. L. Hopper
Per Munn & Co
Attorneys

United States Patent Office.

W. L. HOPPER, OF MONMOUTH, ILLINOIS.

Letters Patent No. 68,197, dated August 27, 1867.

---

IMPROVEMENT IN DEVICE FOR CATCHING ANIMALS.

---

The Schedule referred to in these Letters Patent and making part of the same.

---

TO ALL WHOM IT MAY CONCERN:

Be it known that I, W. L. HOPPER, of Monmouth, in the county of Warren, and State of Illinois, have invented a new and improved Device for Catching Animals; and I do hereby declare that the following is a full, clear, and exact description thereof, which will enable others skilled in the art to make and use the same, reference being had to the accompanying drawings, forming part of this specification, in which—

Similar letters of reference indicate like parts.

The object of this invention is catching hogs and other domestic animals, and it consists in two hooked pieces joined to each other by a pin or pivot so as to turn freely for opening and closing the hooks or horns, as may be required, with which is connected a sliding-bar, that is so formed as to trip when the device is fastened on the leg of an animal, and catch in a rack to hold the hooks or horns of the device around the leg, under the pressure of a spiral spring also connected therewith, as hereinafter more particularly described.

Figure 1:
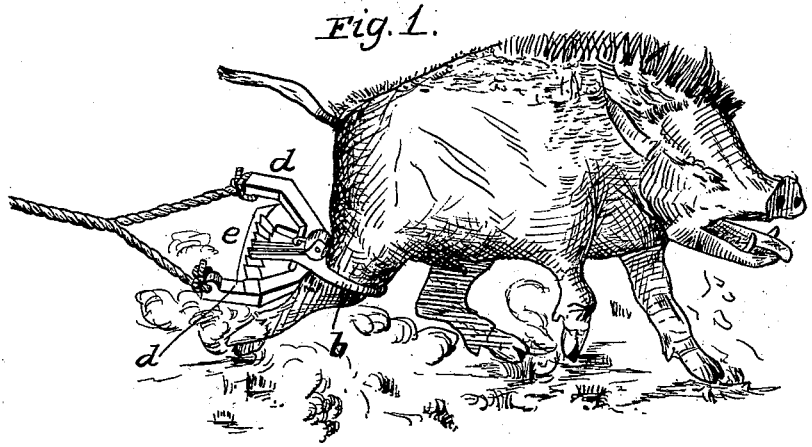
Figure 1 represents my improved stock-catcher attached to the leg of a hog to catch and hold it.

A represents one part and B the other part of the device, which are united by a pin, $a$, having a broad, flat head, $a'$, which fits close down upon one side of the part A, and keeps a bent sliding-bar, $c$, in place within grooves to slide back and forth, as hereinafter explained. On each of the parts A B is a horn or hooked end, $b$, adapted in shape and size to the leg of an animal, for catching which it is to be used, and also a projecting arm, $d$, on each part, opposite to the hooked end $b$ on each part, to which a rope is attached. The part B is provided with a segment rack, $e$, which is engaged by a hook, $c^1$, on one of the free ends of the bent sliding-bar $c$ to hold the hooked ends $b\ b$ together around the leg of an animal when it is caught, as shown in fig. 1. Between the two parts A and B, and around the pin $a$, is placed a spiral spring, $s$.

Figure 2:
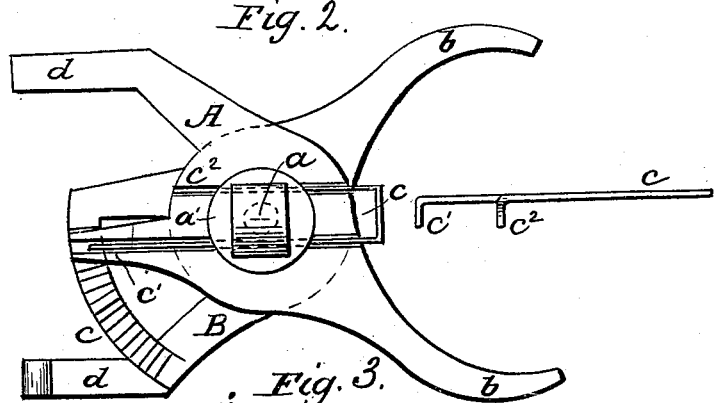
Figure 2 is a top view of the device
Figure 3:
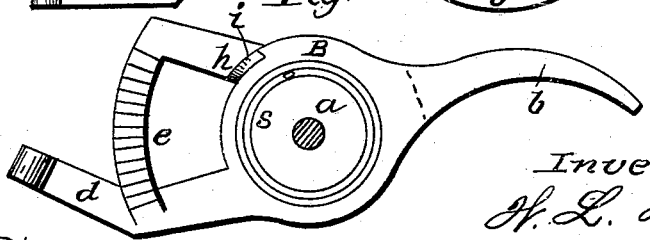
Figure 3 represents one part detached.

To use the device, the sliding-bar $c$ is pushed back by the operator so that its bent part shall project between the hooked ends $b\ b$ of the parts A B, as shown in fig. 2, and the hook $c^2$ on one of the free ends of the sliding-bar $c$ shall rise upon an incline, $h$, and drop into a notch, $i$, on the part B, fig. 3, when at the same time the hook $c^1$, on the other free end of the bar $c$, becomes disengaged from the rack $e$, and the device is then ready for placing on the leg of a hog or other animal to be caught. By slipping the hooks or horns $b\ b$ over the leg of an animal the sliding-rod $c$ is pushed forward, which releases the hook $c^1$ from the notch $i$, when the spring $s$ closes the horns $b\ b$ upon the leg, and the hook $c^1$, of the bar $c$, engages in the rack $e$, and holds all fast until the operator secures the animal with the rope attached to the device, as shown in fig. 1.

Having described my invention, I claim as new, and desire to secure by Letters Patent—

The sliding-bar $c$, in combination with the parts A B and spiral spring $s$, substantially as described for the purpose specified.

W. L. HOPPER.

Witnesses:
N. A. RANKIN,
B. PARSONS.